March 5, 1968

G. A. PRICE 3,371,593

COFFEE BREWING APPARATUS

Filed June 10, 1966

INVENTOR.
GAIL A. PRICE
BY Lyon & Lyon
ATTORNEYS

March 5, 1968

G. A. PRICE 3,371,593

COFFEE BREWING APPARATUS

Filed June 10, 1966

INVENTOR.
GAIL A. PRICE

United States Patent Office 3,371,593
Patented Mar. 5, 1968

3,371,593
COFFEE BREWING APPARATUS
Gail A. Price, Inglewood, Calif., assignor to Farmer Bros. Co., Torrance, Calif., a corporation of California
Continuation-in-part of application Ser. No. 373,240, June 8, 1964. This application June 10, 1966, Ser. No. 556,667
9 Claims. (Cl. 99—283)

This application is a continuation-in-part of the application for Coffee Brewing Apparatus, filed June 8, 1964, Ser. No. 373,240 and now abandoned.

This invention relates to coffee brewing apparatus, more particularly to apparatus for brewing coffee by the filter method in relatively large quantity as required in restaurants. It is customary to provide, as a part of coffee brewing apparatus, a supply tank connected to a water supply line through a valve which is time controlled to meter a predetermined amount of water into a supply tank, and simultaneously deliver previously heated water into a distributor unit for discharge over the coffee contained within a disposable filter cup.

The outlet end of the supply tank within the distributor unit is exposed to atmosphere to avoid pressure build-up in the supply tank when the water is heated. Due to the presence of occluded air and water vapor, and also due to the expansion characteristic of water, a supply tank capable of holding a gallon of water may expand sufficiently to expel a cup or more of water. The water heating cycle take place prior to the brewing cycle, so that if the overflow water were discharged from the distributor unit, it would wet the coffee prematurely; or if the coffee brewing unit were not in place, a stand-by container to catch the overflow water would be required; or, still further, if a container and siphon are provided at the distributor unit, the discharged water cools and reduces the temperature of the later supplied brewing water, with result that an inferior brew of coffee is produced.

A timer in association with a meter valve has been a conventional means of determining the volume of liquid to be discharged. If the pressure of the supply water should vary, the volume of water passing through the meter valve in a given time also changes, necessitating a pressure regulator downstream from the meter valve. Also the effective opening through the meter valve may change, such as by lodgement of a particle.

A solution to the problem is indicated by the following objects:

First, to provide a coffee brewing apparatus wherein overflow water is collected in the distributor head and, as the vapor and occluded air escape, much of the overflow water is permitted to return to the supply tank so that the coffee is not wetted prematurely and the need of a stand-by container is eliminated; and a minimum amount of cooled water mixes with the brewing water.

Second, to provide a coffee brewing apparatus which incorporates a novelly arranged siphon element having two intake siphon ducts, the intake ends of which are at slightly different levels and function to ensure against dripping of water from the distributor head or premature discharge of water from the storage tank.

Third, to provide a coffee brewing apparatus which eliminates the need of a timer to control the volume of the brewing water; instead, the volume being measured directly by use of a siphon in association with a liquid level sensing means which shuts off the supply of water, the siphon being arranged to start delivery of a charge of water when the liquid level reaches essentially the maximum level determined by the sensing means and abruptly terminates delivery when the liquid level reaches a predetermined lower level; thus, the volume of water delivered remains constant, irrespective of line pressure or change in the effective opening of the meter valve.

With the above and other objects in view, as may appear hereinafter, reference is directed to the accompanying drawings in which.

Figure 3:
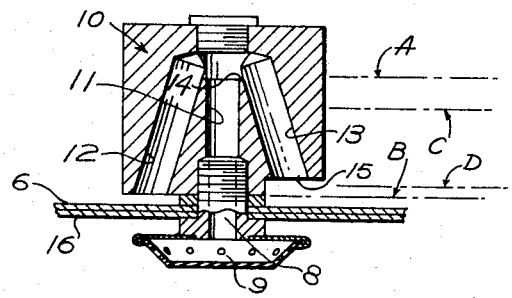
FIGURE 3 is a further enlarged sectional view showing the siphon and taken within circle 3 of FIGURE 2.
Figure 1:
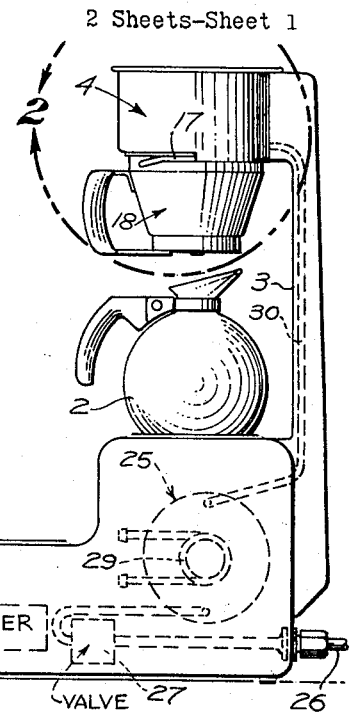
FIGURE 1 is a side view of the coffee brewing apparatus showing one embodiment of the invention.
Figure 4:
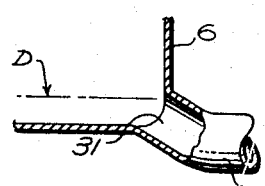
FIGURE 4 is a further enlarged, fragmentary, sectional view taken within circle 4 of FIGURE 2.

Reference is first directed to FIGURES 1 through 5. The coffee brewing apparatus herein illustrated includes a heater housing 1 which may take various forms. In the construction shown, the heater housing 1 is provided with an upper deck and a lower deck, each having one or more heating elements, not shown, on which may be placed conventional coffee decanters 2.

Disposed behind one of the heating elements is a supporting column 3, the upper end of which supports a distributor head structure 4 located in coaxial relation with a heating element so as to discharge brewed coffee into a decanter 2 placed thereon.

The distributor head structure 4 includes a cylindrical shell 5 in which is mounted a brewing water receiver 6, which is cup-shaped and dimensioned to hold a volume of water equivalent to the volume of the decanter 2. The brewing water receiver 6 is provided with a movable cover 7 having a vent. The bottom of the receiver 6 is reduced in diameter and provided with a central opening which receives a stem 8.

Attached to the lower end of the stem 8 and disposed under the receiver 6 is a spray nozzle 9. The upper end of the stem 8 is screwthreaded and is joined to a siphon 10. The siphon includes a vertical outlet duct 11 which receives the stem 8, and a pair of upwardly converging inlet ducts 12 and 13. The upper ends of the outlet duct 11 and inlet ducts 12 and 13 form a common chamber, the lower wall of which forms a siphon crest 14. One corner of the siphon block 10 is notched as indicated by 15 so that the inlet 13 has an entrance end slightly higher than the entrance end of the inlet duct 12.

The lower portion of the shell 5 is closed by a partition plate 16, the central portion of which may be clamped between the spray nozzle 9 and the siphon block 10. Secured to the bottom extremity of the shell 5 below the partition plate 16 is a U-shaped guide and support rod 17. A brewing vessel 18 is provided which includes an external flange 19 at its upper end adapted to overlie the guide and support rod 17 so that the brewing vessel 18 may be slipped horizontally under the distributor head structure 4.

Figure 5:
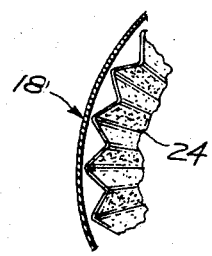
FIGURE 5 is a further enlarged, fragmentary, sectional view taken through 5—5 of FIGURE 2.
Figure 2:
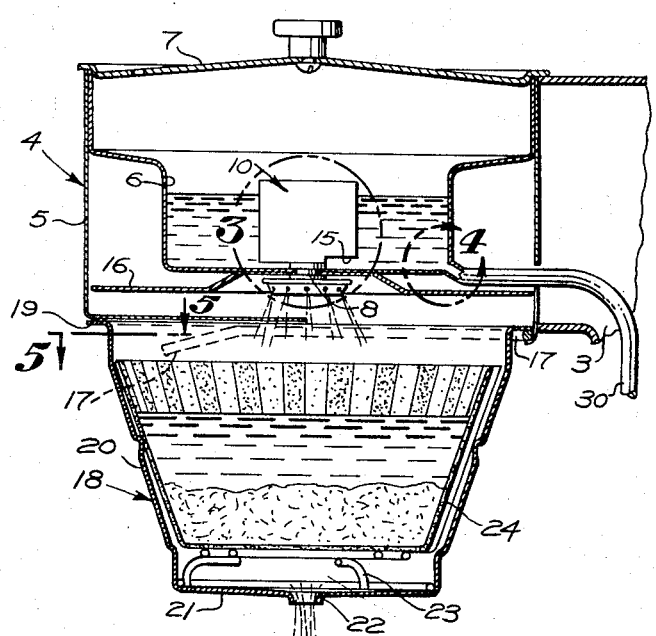
FIGURE 2 is an enlarged sectional view thereof taken within circle 2 of FIGURE 1.

The brewing vessel 18 is provided with downwardly converging side walls 20 and a flat bottom 21. Centered in the bottom 21 is a discharge opening 22 which aligns with the mouth of the decanter 2. The brewing vessel 18 receives a supporting frame 23 and a filter basket 24, the basket being formed of filter paper and having corrugated side walls, as indicated in FIGURE 5.

Mounted within the heater housing 1 is a brewing water supply tank 25. An inlet line 26 connected to a source of water extends into the heater housing 1 and is connected to the supply tank 25. Interposed in the inlet line 26 is a valve 27 which is preferably electrically controlled by a timer 28 or a weighing device disposed under the decanter 2 or other conventional means, so that a predetermined volume of water may be delivered to the supply tank 25 in order to displace a similar volume of water therefrom. The supply tank 25 is provided with a conventional heater 29. An outlet line 30 leads from the supply tank 25 to the distributor head structure 4, and is provided with an outlet end 31 which is located at or adjacent the bottom of the brewing water receiver 6.

Operation of the coffee brewing apparatus is as follows:

When it is desired to brew a decanter of coffee, a disposable filter 24 and a charge of coffee are placed in the brewing vessel 18 and the brewing vessel inserted under the distributor head structure 4. The valve 27 is opened to cause previously heated brewing water to discharge through the outlet line 30 and enter the brewing water receiver 6. Water does not flow into the brewing vessel 18 until it reaches the level A above the siphon crest 14, as indicated in FIGURE 3. After a predetermined quantity of water has been delivered to the receiver 6, the valve 27 closes, but water continues to flow from the receiver 6 to the brewing vessel 18 until the siphon action of the siphon is broken. When the water level reaches the underside 15 of the inlet duct 13, the water continues to flow until the water level reaches the underside of the inlet duct 12, and then stops suddenly without residual dripping from the spray nozzle 9. It is believed that this phenomenon is due to the fact that a slight negative pressure exists in the ducts 12 and 13 and that flow may actually stop in the duct 13 permitting the surface tension of the water to cause a positive meniscus to form so as to seal the duct 13 while water level continues to recede. Undoubtedly this effect is aided by the fact that the margins of the entrance end of the duct 13 are smooth and essentially parallel with the water surface.

Immediately on initial displacement of heated water from the supply tank 25 by cold water from the inlet line 26, the heater 29 heats the water in the supply tank, eventually raising it to brewing temperature. In doing so, occluded air as well as water vapor in the tank expands, driving a portion of the water from the supply tank 25 into the receiver 6. This overflow water may reach a level one-half to three-quarters the height of the siphon crest 14. As the air and vapor escape through the outlet line 30, the water drains back through the outlet line to the supply tank 25 and lowers the water level in the receiver 6 to a minimum level D, slightly above the residual water level B, as shown in FIGURE 3, but still below the intake end of the duct 13.

The water which remains, of course, cools before a subsequent brewing cycle. However, the amount of the cooled water is minimal, so that when mixed with the incoming hot water, does not appreciably reduce the temperature of the brewing water.

It will be observed that the supply tank 25 is at no time under pressure, as it is at all times exposed to atmospheric pressure through the outlet line 30 and the siphon 10 or the vent in the cover 7.

Figure 7:
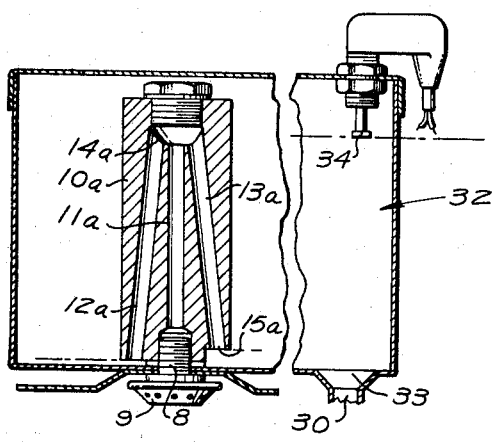
FIGURE 7 is an enlarged fragmentary, sectional view thereof taken in a plane parallel to FIGURE 6 showing the measuring and dispensing unit.
Figure 6:
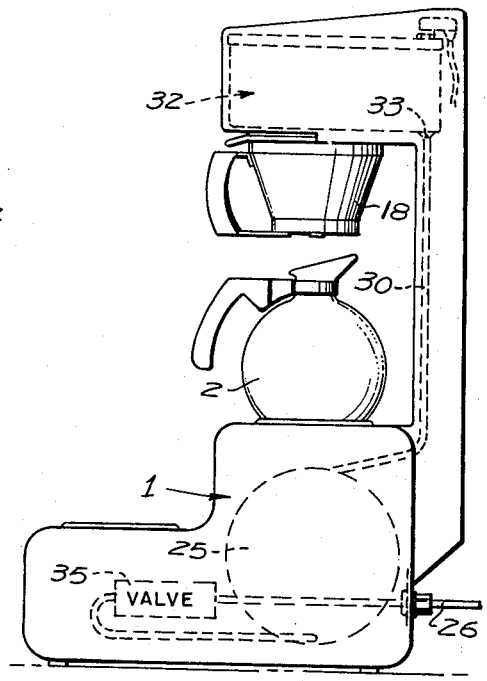
FIGURE 6 is a side view of a coffee brewing apparatus showing another embodiment of the invention.

Reference is now directed to FIGURES 6 and 7. This construction utilizes a heater housing 1 is essentially the same as the heater housing shown in the first described structure. In this construction, a brewing water receiver 32 is substituted for the brewing water receiver 6 of the first structure. The receiver 32 is dimensioned to hold a charge of water equal to the capacity of the decanter 2. The receiver 32, like the receiver 6, is provided with an inlet 33 in its bottom side, connected to the tank outlet line 30.

Mounted in the receiver 32 is a siphon 10a which is identical to the siphon 10 except that the vertical depth is increased. More particularly, the siphon 10a includes an outlet duct 11a, inlet ducts 12a and 13a, communicating at their upper ends with the outlet duct and defining a crest 14a. Also the entrance end of the inlet duct 13a is slightly higher than the entrance end of the inlet duct 12a. The siphon 10a functions in the same manner as the siphon 10; that is, the water recedes below the entrance end of the inlet duct 13a in the manner explained in connection with the siphon 10.

Located at a level slightly above the crest 14a of the siphon, is a water level sensor 34. The sensor, per se, is conventional and includes a pair of probes. Water on reaching the level of the sensor, completes a circuit between the probes.

Water is supplied in the same manner as in the first described structure, through a supply line 26 which is connected to the tank 25. A valve 35 is interposed in the supply line. No timer is employed; instead, the water level sensor 34, operating through an amplifier 36 and relay 37, indicated in FIGURE 10, closes the valve 35 when the water reaches the level determined by the sensor. A manual starter switch 38 opens the valve 35 so as to supply water to the bottom of the tank and force heated brewing water into the receiver 32.

Operation of the brewing apparatus as shown in FIGURES 6 and 7 is as follows. The heating element 29 regulated by a thermostat 29a heats and maintains the brewing water at the proper temperature; preferably, only a few degrees below the boiling temperature of the water.

When the starter switch 38 is closed, the valve 35 opens to admit water into the tank from the supply line. The incoming water drives the heated water through the supply line 26 to the receiver 32. The water rises in the receiver until the water level reaches the crest 14a of the siphon, whereupon water discharges from the reservoir into the brewing vessel 18, then into the decanter 2.

The water level sensor 34 is located slightly higher than the crest 14a. Also the outlet duct 11a is smaller than the supply line 26. As a result, the water level continues to rise the short distance necessary to actuate the water level sensor 34, even though water is discharging from the siphon. When the water completes the circuit across the sensor 34, the valve 35 is closed, whereupon the water is siphoned from the receiver 32 and delivered through the brewing unit 18 to the decanter 2.

The siphon 10a functions in the same manner as the siphon 10. A sharp cutoff of water occurs with essentially no dripping by reason of the arrangement of the entrance ends of the inlet ducts 12a and 13a at different levels.

Also as in the first described structure, any water which upwells from the tank due to the presence of occluded gases, or for other reasons, is collected in the receiver 32 and then is returned to the tank when conditions reach equilibrium. Thus, as in the first described structure, residual water in the receiver is minimized.

Figure 9:
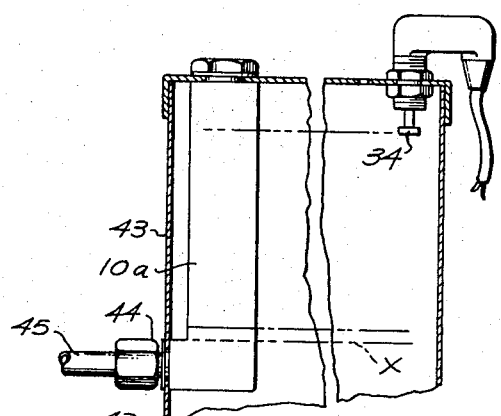
FIGURE 9 is an enlarged fragmentary, sectional view thereof taken in a plane parallel to FIGURE 8 showing the upper portion of the storage and heater tank.
Figure 8:
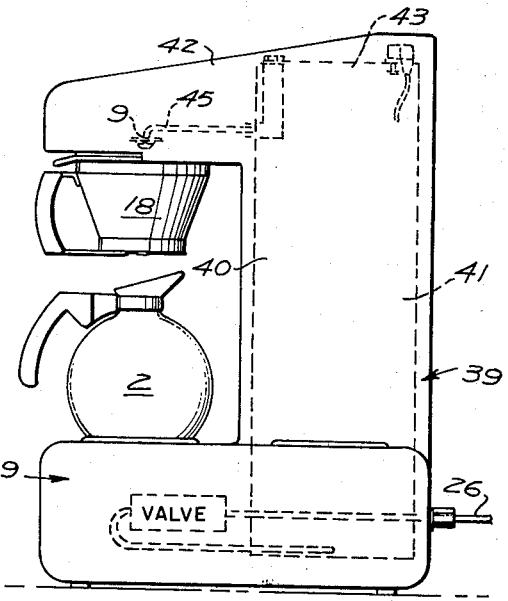
FIGURE 8 is a side view of another coffee brewing apparatus showing another embodiment of the invention.

Reference is now directed to FIGURES 8 and 9. In this construction, the receiver is an integral part of the tank. That is, the receiver constitutes the upper end of the tank. More particularly, a modified heater housing 39 is provided which includes an upstanding shell 40, containing a tank 41. A head structure 42 extends laterally from the upper end of the shell 40, its lower surface being below the upper extremity of the tank 41. As stated previously, the upper end of the tank forms a receiver portion designated 43. Within the receiver portion of the tank, is mounted a siphon 10a. In this case, the siphon is provided at its lower end with a side outlet 44 which is connected to a discharge line 45, terminating above the brewing vessel 18 and provided with a spray nozzle 9, as in the previously described structures. A water level sensor 34 is located slightly above the crest 14a as shown in FIGURE 7.

Figure 10:
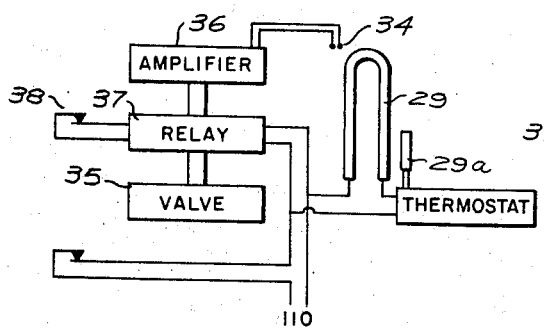
FIGURE 10 is a block diagram showing the operating means for the constructions shown in FIGURES 6 through 8.

Electrically, the circuit employed in the construction shown in FIGURES 8 and 9 is the same as that shown in FIGURES 6 and 7 and is represented in FIGURE 10.

Operation of the construction shown in FIGURES 8 and 9 is as follows:

Prior to initiating the brewing of the decanter of coffee, the liquid level in the tank 41 is at the level X, corresponding to the entrance end of the inlet duct 12a. The plane thus defined, constitutes the plane separating the receiver portion 43 from the tank 41. When the starter switch 38 is closed, the valve 35 opens, admitting water to the bottom of the tank 41, causing the previously heated water to rise in the receiver portion 43, until the water level sensor 34 closes a circuit causing the valve 35 to shutoff. The siphon 10a causes the water between the plane X and the water level sensor to discharge through the brewing vessel 18 into the decanter. The volume of this water corresponds to the capacity of the decanter.

During the subsequent heating of the water in the tank in preparation for another brew of coffee, the excess water rises into the receiver 43 and then recedes, all without discharge of any water through the siphon.

While particular embodiments of this invention have been shown and described, it is not intended to limit the same to the details of the constructions set forth, but instead, the invention embraces such changes, modifications, and equivalents of the various parts and their relationships as come within the purview of the appended claims.

What is claimed is:

1. A coffee brewing apparatus, comprising:
   (a) a hot water supply means including a tank, means for supplying a predetermined quantity of water to said tank for discharge of a like quantity of water therefrom, and a heating element to heat the water therein to brewing temperature;
   (b) a brewing water receiver in communication with said tank;
   (c) a spray nozzle for discharge of brewing water from said receiver;
   (d) a siphon interposed between said spray nozzle and said receiver for delaying flow of brewing water from said spray nozzle until the water level in said receiver has reached a predetermined upper level and to terminate the flow of brewing water when the water has reached a predetermined lower level;
   (e) the communication between said receiver and said tank being so arranged that, any water, due to expansion or presence of occluded gases, as said water is heated, which is in excess of the water supplied to said tank, is collected in said receiver, and is permitted to return to said tank as the temperature of the water reaches equilibrium;
   (f) and a brewing vessel adapted to receive a filter and coffee, and adapted to be positioned under said spray nozzle for discharge of brewed coffee into a decanter.

2. A coffee brewing apparatus, according to claim 1, comprising:
   (a) said siphon includes a downwardly directed outlet passage connected to said spray nozzle; a first upwardly directed inlet passage; a second upwardly directed inlet passage; and a common crown chamber connecting all of said passages;
   (b) the entrance end of said first inlet passage being higher than the entrance end of the second inlet passage, and its entrance end presenting a smooth, continuous and horizontal under surface;
   (c) the entrance end of said second inlet passage being below the entrance end of the first inlet passage, a distance within the dimensions of a positive meniscus developed by reason of the surface tension of the water, whereby water continues to flow through the second siphon, while the water recedes below the first inlet passage until the surface tension of the water is exceeded, thereby to produce an airgap between said water surface and said first inlet passage.

3. A coffee brewing apparatus according to claim 1, wherein:
   (a) said brewing water receiver is a container separate from said tank and is disposed at a level above said tank;
   (b) and a tube constitutes the communication between said receiver and said supply tank, said tube being connected to the bottom side of said receiver to minimize the quantity of residual water in said receiver.

4. A coffee brewing apparatus according to claim 1, wherein:
   (a) said brewing water receiver is a container separate from said tank, disposed at a level above said tank, and has a capacity, within the boundaries of said upper and lower water levels, equal to said decanter;
   (b) and a water level sensing means disposed at said upper water level terminates the supply of water to said tank when the water reaches its upper level.

5. A coffee brewing apparatus according to claim 1, wherein:
   (a) said brewing water receiver is an integral part of said tank and constitutes the upper end thereof;
   (b) and a water level sensing means disposed at said upper water level terminates the supply of water to said tank.

6. A coffee brewing apparatus, comprising:
   (a) a water supply tank;
   (b) means for heating and maintaining water in said tank at a brewing temperature;
   (c) a valve for controlling admission of water at ambient temperature to said tank;
   (d) means for receiving a charge of brewing water from said tank;
   (e) a brewing unit positioned to pass brewing water by gravity flow from said receiving means to a decanter;
   (f) a water level sensor in said receiving means for closing said valve when water in said receiving means reaches a predetermined upper level;
   (g) a siphon in said receiving means, having an outlet communicating with said brewing unit, a crest disposed near but below the liquid level determined by said sensor, and an inlet for determining a lower level of water in said receiving means;
   (h) the capacity of said receiver between said water levels being approximately the capacity of said decanter.

7. A coffee brewing apparatus according to claim 6, wherein:
   (a) said brewing water receiving means is a container separate from said tank and disposed at a level above said tank.

8. A coffee brewing apparatus according to claim 6, wherein:
   (a) said brewing water receiving means is an integral part of said tank and constitutes the upper end thereof.

9. A coffee brewing apparatus according to claim 6, wherein said siphon further includes:
   (a) a pair of inlet ducts and an outlet duct in communication at said crest, one of said inlet ducts having an entrance disposed higher than the other a distance within a positive meniscus developed by reason of the surface tension of the water, whereby water continues to enter the lower entrance, causing the water to recede below the higher entrance until the surface tension of the water is exceeded, thereby to produce an air gap between the water surface and the higher entrance.

References Cited

UNITED STATES PATENTS

| | | | |
|---|---|---|---|
| 2,161,604 | 6/1939 | Watts | 68—12 |
| 2,540,431 | 2/1951 | Davis et al. | 68—17X |
| 2,862,440 | 12/1958 | Oakes | 99—282 |
| 3,034,417 | 5/1962 | Bunn | 99—283 |
| 3,092,012 | 6/1963 | Ruhnke | 99—307 |

FOREIGN PATENTS 270,263   12/1929   Italy.

WILLIAM I. PRICE, *Primary Examiner.*